(No Model.)
T. P. CHAMBERLIN.
FOLDING BUGGY TOP.
No. 491,983. Patented Feb. 21, 1893.
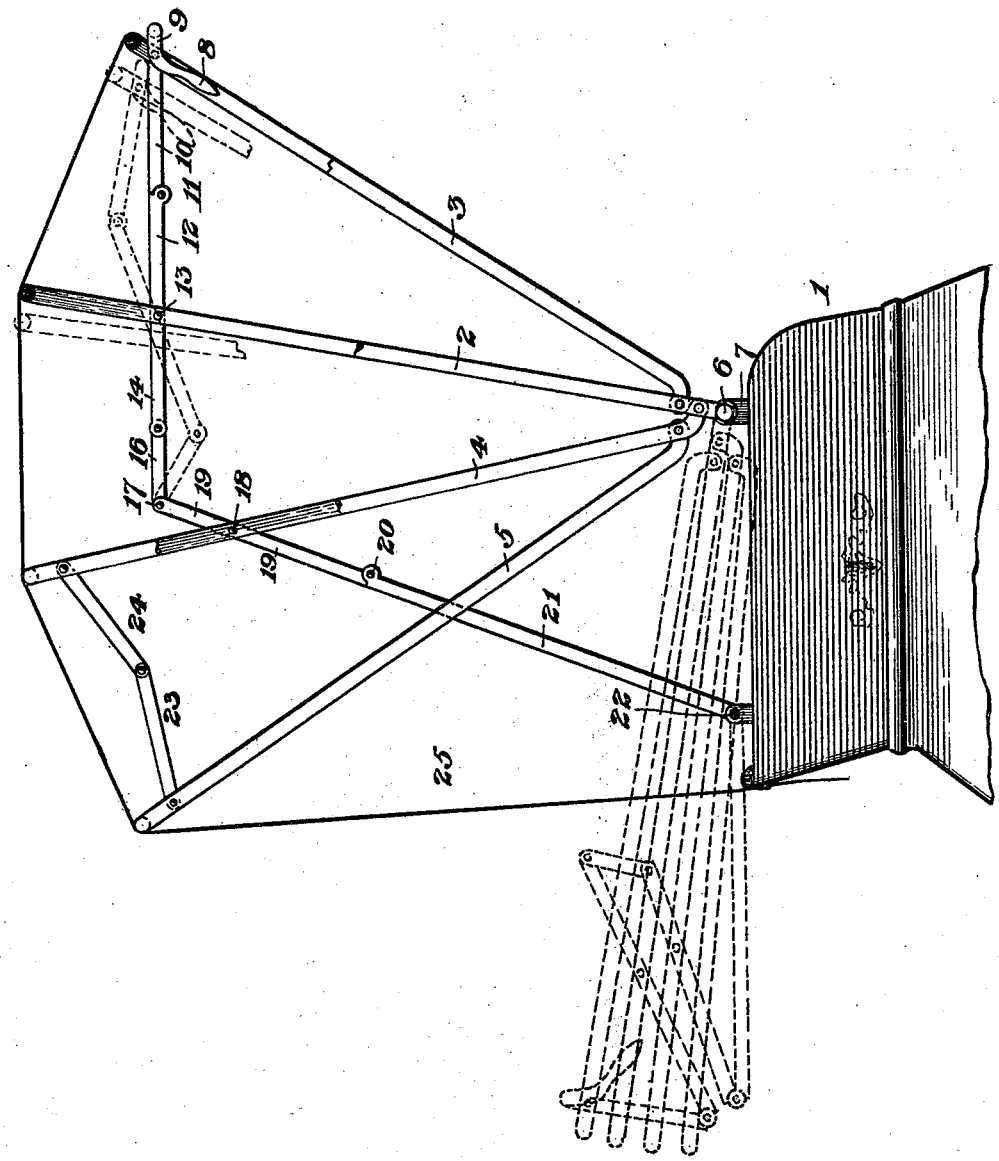

UNITED STATES PATENT OFFICE.

THOMAS P. CHAMBERLIN, OF FORT RECOVERY, OHIO.

FOLDING BUGGY-TOP.

SPECIFICATION forming part of Letters Patent No. 491,983, dated February 21, 1893.

Application filed October 3, 1892. Serial No. 447,623. (No model.)

*To all whom it may concern:*

Be it known that I, THOMAS P. CHAMBERLIN, a citizen of the United States, residing at Fort Recovery, in the county of Mercer and State of Ohio, have invented a certain new and useful Improvement in Folding Buggy-Tops, of which the following is a specification.

My invention relates to folding braces to keep the bows in an upright position and the cover stretched or to fold the same to the rear and from over the heads of the occupants of the seat. I can attain this object by the mechanism illustrated in the following drawing which illustrates a side elevation of a portion of a buggy body and, the bows with my invention or improvement applied. Over the bows and between them and the linked and pivoted brace the cover is to be attached in the usual or any preferred manner.

Bow 2, is pivoted to bed bracket 7 at 6. Front bow 3 and rear bows 4 and 5 are pivoted together in the usual manner, so as to assume a parallel position when folded as indicated in dotted lines. The front link 10 is bent into U shape near its front end and terminates in a handle 8, which is bent downward so as to be practically parallel with the front bow 3 when the top is up. Link 10 is pivoted to the front bow at 9 which pivot is the fulcrum of lever 8. Link 10 at its rear end is pivoted by a rule joint 11, to link 12. Link 12 near the center of its length, is pivoted to bow 2, at 13. The rear end of link 12 is pivoted by a loose joint to the front end of a short link 16, the rear end of which is pivoted by a loose joint 14 to the upper end of link 19 which is pivoted near its middle length to bow 4. The lower end of link 19 is pivoted by a rule joint 20 to the upper end of a long brace link 21, which is pivoted at its lower end by a loose joint 22 to a brace on the buggy body. Now it will be apparent that by the above construction where the pivots 9, 11, 13, 14 and 17 are in a straight line and pivots 17, 18, 20 and 22 are in another straight line the brace will be locked or rigid and the bows all held in their upright position and the cover stretched and smooth. If it is desired now to fold or lay the top back the occupant has but to pull lever 8, to the rear which raises the rear end of link 10, thus breaking the lock and permitting an easy folding into the position indicated by the dotted lines.

I have shown but one brace but in some cases it would be preferable to have one on each side as better security against wind. I may also use links 23 and 24 and strap 25 as stays in stormy weather but these are not usually necessary, or any part of my invention. I may also in some cases put the brace on the inside of the bows.

What I claim as new, and desire to secure by Letters Patent, is—.

The brace for buggy tops consisting of link 10 having handle 8; links 12, 16, 19 and 21, and pivots 9, 11, 13, 14, 17, 20 and 22 substantially as and for the purposes described.

THOMAS P. CHAMBERLIN.

Witnesses:
 GEO. W. SCHEID,
 WM. WHITESELL.